(12) United States Patent
Ashiura et al.

(10) Patent No.: US 7,772,325 B2
(45) Date of Patent: Aug. 10, 2010

(54) THERMOPLASTIC ELASTOMER COMPOSITION

(75) Inventors: Makoto Ashiura, Hiratsuka (JP); Tetsuji Kawazura, Hiratsuka (JP); Kazuo Arakawa, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/614,202

(22) Filed: Nov. 6, 2009

(65) Prior Publication Data

US 2010/0056723 A1   Mar. 4, 2010

Related U.S. Application Data

(63) Continuation of application No. 11/955,216, filed on Dec. 12, 2007, now abandoned.

(30) Foreign Application Priority Data

Dec. 13, 2006   (JP) .............................. 2006-335988

(51) Int. Cl.
| | |
|---|---|
| *C08F 8/00* | (2006.01) |
| *C08L 23/00* | (2006.01) |
| *C08L 23/04* | (2006.01) |
| *C08L 23/10* | (2006.01) |
| *C08L 23/26* | (2006.01) |
| *C08L 23/36* | (2006.01) |

(52) U.S. Cl. ...................... 525/192; 525/193; 525/194; 525/217; 525/240

(58) Field of Classification Search ................ 525/192, 525/193, 194, 217, 240
See application file for complete search history.

(56) References Cited

U.S. PATENT DOCUMENTS

| | | | |
|---|---|---|---|
| 3,037,954 A | | 6/1962 | Gessler et al. |
| 6,491,992 B1 * | | 12/2002 | Koizumi et al. ............... 428/34 |
| 2007/0093607 A1 * | | 4/2007 | Ashiura et al. .............. 525/260 |

FOREIGN PATENT DOCUMENTS

| | | |
|---|---|---|
| JP | 06-172547 A | 6/1994 |
| JP | 2006-193577 | 7/2006 |
| JP | 2007-231244 A | 9/2007 |

OTHER PUBLICATIONS

A.Y. Coran, et al, "Rubber-Thermoplastic Compositions. Part V. Selecting Polymers for Thermoplastic Vulcanizates", pp. 116-136, vol. 55, Oct. 13-16, 1981.

* cited by examiner

*Primary Examiner*—Nathan M Nutter
(74) *Attorney, Agent, or Firm*—Connolly Bove Lodge & Hutz LLP

(57) ABSTRACT

A thermoplastic elastomer composition containing a dynamically cross-linked composition of
(A) 10 to 70 parts by weight of a thermoplastic resin,
(B) 30 to 90 parts by weight of a modified butyl rubber composition containing a modified butyl rubber modified reacting, to butyl rubber, (a) a compound containing, in the molecule thereof, a nitroxide free radical stable at ah ordinary temperature in the presence of oxygen, and (c) a bifunctional or higher functional radical polymerizable monomer, and
(C) 0.01 to 15 parts by weight of a cross-linking agent.

8 Claims, 1 Drawing Sheet

THERMOPLASTIC ELASTOMER COMPOSITION

CROSS-REFERENCE APPLICATION

Figure 1:
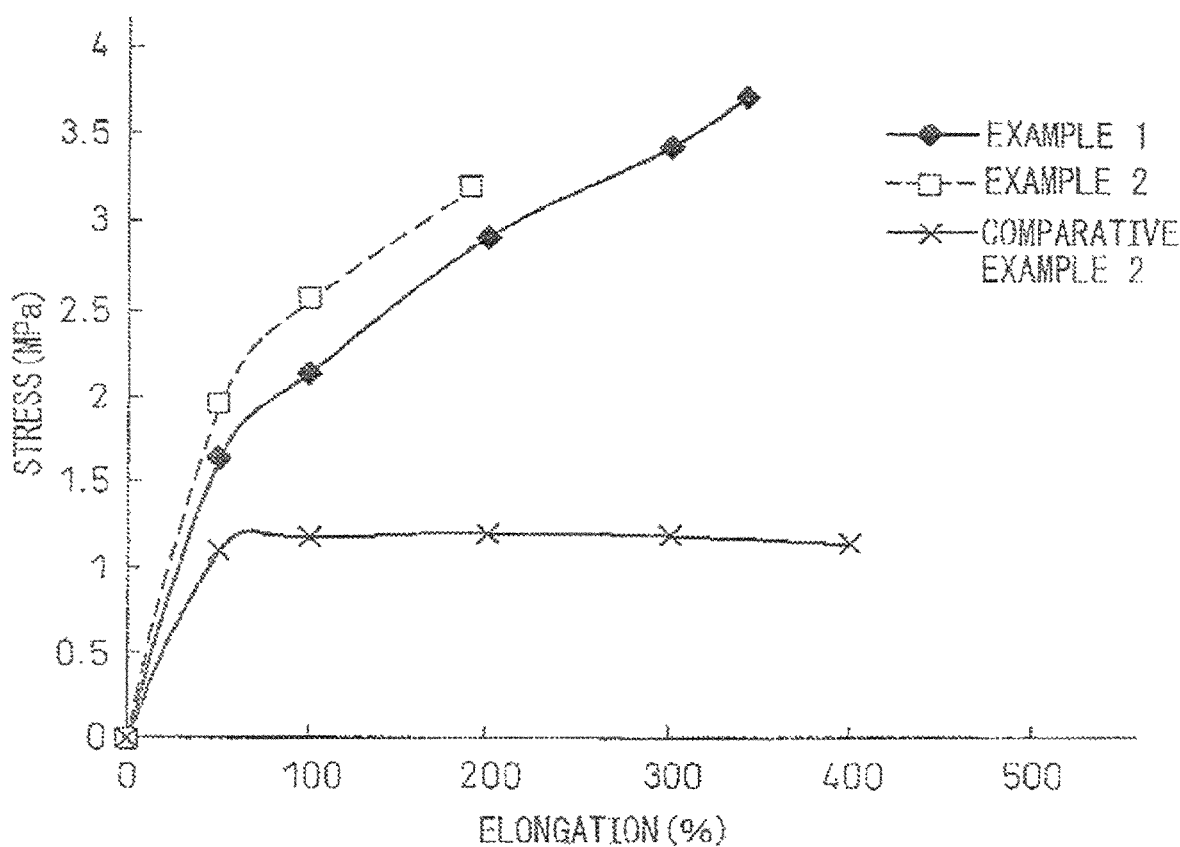

This application is a Continuation application of U.S. patent application Ser. No. 11/955,216, filed Dec. 12, 2007, and now abandoned.

TECHNICAL FIELD

The present invention relates to a thermoplastic elastomer composition, and more particularly relates to a thermoplastic elastomer composition which can be obtained from dynamically cross-linking of a thermoplastic resin and a modified butyl rubber composition with a cross-linking agent.

BACKGROUND ART

A thermoplastic elastomer (i.e., TPE) is a polymeric material exhibiting a thermoplasticity similar to a thermoplastic resin at a high temperature and exhibiting a rubber elasticity similar to an elastomer at an ordinary temperature. Generally, by a blend of a thermoplastic resin and elastomer containing the domain phase of an elastomer closely and uniformly dispersed in a continuous phase of a thermoplastic resin, the characteristic properties of TPE are exhibited. On the other hand, a polymer blend prepared by a dynamically cross-linking process of mixing a cross-linkable elastomer in a continuous phase of a thermoplastic resin, cross-linking the elastomer in a kneaded state, and finely dispersing the cross-linkable elastomer in the continuous phase exhibits the characteristic properties of TPE and has superior characteristic properties compared with a simple blend of the two polymer components. Rubber. Chem. Technol. 55, 116 (1982) and U.S. Pat. No. 3,037,954 disclose technologies for the preparation of TPE by dynamic cross-linking and describe, among these, using polypropylene as the thermoplastic resin and butyl rubber as the cross-linkable elastomer to prepare a PP/IIR-based TPE, wherein, the cross-linking of the butyl rubber uses resin cross-linking.

Butyl rubber has an extremely low degree of unsaturation, and therefore, is excellent in weatherability, heat resistance, ozone resistance, etc. and is also has a low air permeability, and, therefore, is suitable for use as a sealant, adhesive, etc. As methods for cross-linking the butyl rubber, sulfur cross-linking, quinoid cross-linking, resin cross-linking, etc. are known, but currently it is hard to say that any method is satisfactory in practice. That is, sulfur cross-linking requires cross-linking at a high temperature over a long time. Further, quinoid cross-linking usually uses toxic red lead oxide as an oxidizing agent to activate the quinoid and, therefore has environmental problems. Further, resin cross-linking has a remarkably slow reaction rate and requires heating at a high temperature over a long time. Thus, the result is liable to be a product in a state not completely cross-linked, and therefore there is the problem that, during the use thereof, a cross-linking reaction is liable to occur and the physical properties are liable to greatly change. Further, among the methods of cross-linking a diene-based rubber, etc., the cross-linking with an organic peroxide, which is extremely excellent in heat resistance, is almost never used as a method for cross-linking butyl rubber. This is because, if this cross-linking is applied to butyl rubber, the decomposition reaction of the main chain is liable to occur in preference to the cross-linking and the resultant product is liable to be softened rather than cross-linked. On the other hand, partially cross-linked butyl rubber is commercially available as a butyl rubber capable of being cross-linked with an organic peroxide, but this has the problem of insufficient processability. Further, Japanese Patent Publication (A) No. 6-172547 discloses a method of cross-linking an un-crosslinked butyl rubber in the presence of an organic peroxide and a polyfunctional monomer containing an electron-attractive group, but, according to this method, severe reversion is liable to occur.

The present inventors previously found a modified butyl rubber composition including a modified butyl rubber capable of being cross-linked with an organic peroxide by adding, to the butyl rubber, (a) a compound such as TEMPO (i.e., 2,2,6,6-tetramethylpiperidine 1-oxyl) derivative stable at an ordinary temperature even in the presence of oxygen and having, in the molecule thereof, a nitroxide-free radical, (b) a radical initiator and (c) a bifunctional or higher functional radical polymerizable monomer, followed by reacting the mixture (see Japanese Patent Application No. 2006-131780). Thus, as stated above, the TPE of butyl rubber/polyolefin is currently dynamically cross-linked by resin cross-linking. There are no examples in which dynamic cross-linking by peroxide cross-linking is applied to the butyl rubber/polyolefin.

DISCLOSURE OF THE INVENTION

Accordingly, the object of the present invention is to provide a butyl rubber/polyolefin-based TPE obtained by dynamic cross-linking by peroxide cross-linking of a butyl rubber having superior weatherability, heat resistance, ozone resistance and the like and having low air permeability.

In accordance with the present invention, there is provided a thermoplastic elastomer composition comprising a dynamically cross-linked composition of (A) 10 to 70 parts by weight of a thermoplastic resin, (B) 30 to 90 parts by weight of a modified butyl rubber composition containing a modified butyl rubber modified by reacting, to butyl rubber, (a) a compound containing, in the molecule thereof, a nitroxide free radical stable at an ordinary temperature, preferably a at room temperature in the presence of oxygen, and (c) a bifunctional or higher functional radical polymerizable monomer, and, (C) 0.01 to 15 parts by weight of a cross-linking agent.

According to the present invention, by using a modified butyl rubber composition capable of being cross-linked with a peroxide, preparation of a butyl rubber/polyolefin-based TPE using dynamic cross-linking by peroxide cross-linking becomes possible and a thermoplastic elastomer composition having improved heat aging resistance and settability can be obtained.

BRIEF DESCRIPTION BF THE DRAWINGS

FIG. 1 shows cross-linking curves showing the cross-linking characteristics of the rubber compositions obtained in Examples 1 to 2 and Comparative Example 2.

BEST MODE FOR CARRYING OUT THE INVENTION

The inventors engaged in intensive studies to enable ordinary butyl rubber to be cross-linked with an organic peroxide and, as a result, found that the desired thermoplastic elastomer composition can be obtained by dynamically cross-linking a composition containing (A) 10 to 70 parts by weight, preferably 10 to 50 parts by weight, of a thermoplastic resin, (B) 30 to 90 parts by weight, preferably 50 to 90 parts by weight, of a modified butyl rubber composition containing a modified butyl rubber modified by reacting, to butyl rubber, (a) a compound having, in the molecule thereof, a nitroxide-free radical stable at an ordinary temperature in the presence of oxygen, (b) a radical initiator and (c) a bifunctional or higher functional radical polymerizable monomer and (C) 0.01 to 15 parts by weight, preferably 0.1 to 10 parts by weight, of a cross-linking agent.

In the present invention, the thermoplastic resin usable as the component (A) is not particularly limited. A polymer described in JIS K6900 etc. may be used, but, in particular, a crystalline polyolefin, specifically one or more of polyolefin, polypropylene, ethylene-propylene copolymer, copolymer of ethylene and/or propylene and α-olefin, copolymer of ethylene and/or propylene and butane. etc. may be mentioned.

If the amount of thermoplastic resin is small, the thermoplasticity is undesirably lost, while conversely if it is large, the rubber elasticity is undesirably lost.

In the past, a butyl rubber/polyolefin TPE could not be dynamically cross-linked by peroxide cross-linking and had been dynamically cross-linked by resin cross-linking. However, according to the present invention, by using a modified butyl rubber composition capable of being cross-linked by peroxide cross-linking, preparation of a butyl rubber/polyolefin-based TPE using dynamic cross-linking by peroxide cross-linking becomes possible.

In the present invention, as the component (B), a modified butyl rubber composition containing modified butyl rubber modified by reacting butyl rubber with (a) a compound containing, in the molecule thereof, a nitroxide-free radical stable at an ordinary temperature in the presence of oxygen, preferably 0.001 to 0.5 part by weight per 100 parts by weight of butyl rubber, (b) a radical initiator, preferably 0.001 to 0.5 part by weight per 100 parts by weight of butyl rubber, and (c) a bifunctional or higher functional radical polymerizable monomer, preferably 0.001 to 0.5 part by weight per 100 parts by weight of butyl rubber, is used.

According to another aspect of the present invention, the modified butyl rubber composition of the component (B) can be obtained by reacting the compound (a) and the radical initiator (b) to obtain a previously modified butyl rubber and blending the radical polymerizable monomer (c) therein.

The modified butyl rubber used in the present invention is a copolymer rubber of isobutylene and a small amount (e.g., 0.6 to 2.5 mol % of the entire rubber) of isoprene or chlorinated butyl rubber, brominated butyl rubber, or another derivative, which is generally called a "butyl rubber (IIR)". These are well known among persons skilled in the art. The large number of commercially available products can be used.

The compound (a) having, in the molecule thereof, a nitroxide radical stable at an ordinary temperature in the presence of oxygen, used in the present invention is not limited thereto, but the following compounds may be illustrated.

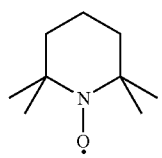

2,2,6,6-tetramethyl-1-piperidinyloxy (TEMPO)

-continued

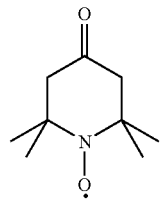

4-oxo TEMPO

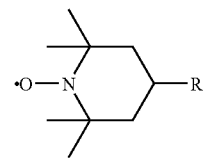

(1)

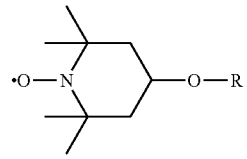

(2)

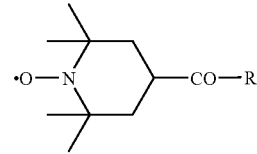

(3)

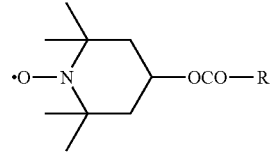

(4)

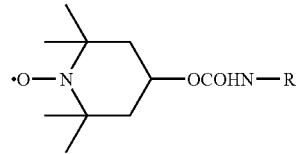

(5)

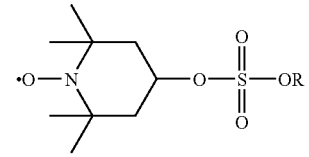

(6)

In the above formulae (1) to (6), R is a $C_1$ to $C_{30}$ alkyl group, allyl group, amino group, isocyanate group, hydroxyl group, thiol group, vinyl group, epoxy group, thirane group, carboxyl group, carbonyl group-containing group for example, succinate anhydride, maleate anhydride, glutamate anhydride, phthalate anhydride, or other cyclic acid anhydride, amide group, ester group, imide group, nitrile group, thiocyan group, $C_1$ to $C_{20}$ alkoxy group, silyl group, alkoxysilyl group, nitro group or other organic group including a functional group.

(1)
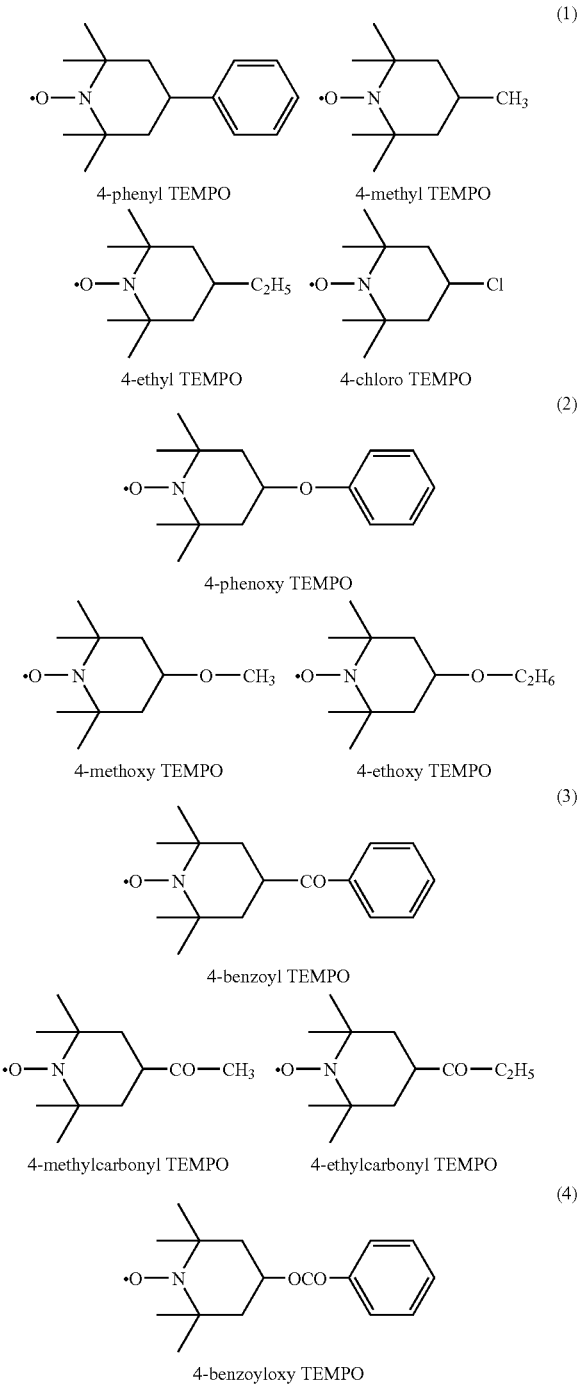
(2)
(3)
(4)
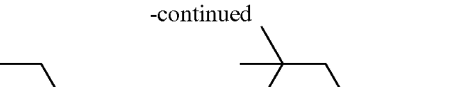
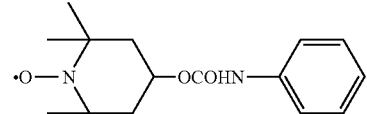
4-acetoxy TEMPO    4-ethoxycarbonyl TEMPO
(5)
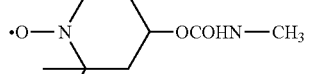
4-(N-phenylcarbamoyloxy) TEMPO
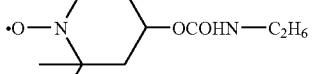
4-(N-methylcarbamoyloxy) TEMPO
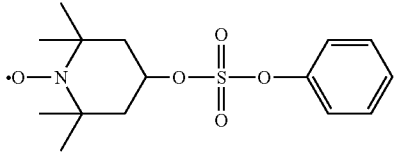
4-(N-ethylcarbamoyloxy) TEMPO
(6)
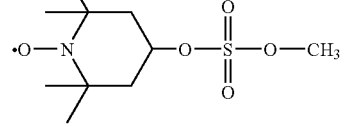
phenyl (4-TEMPO) sulfite
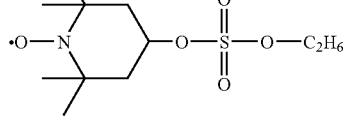
methyl (4-TEMPO) sulfite
ethyl (4-TEMPO) sulfite
Other examples are as follows.
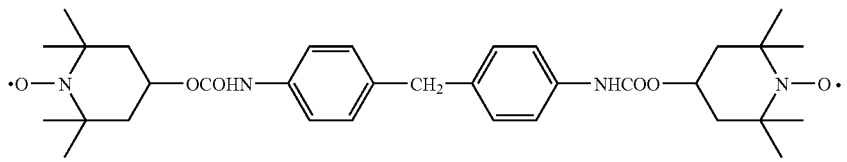
MDP-TEMPO -continued
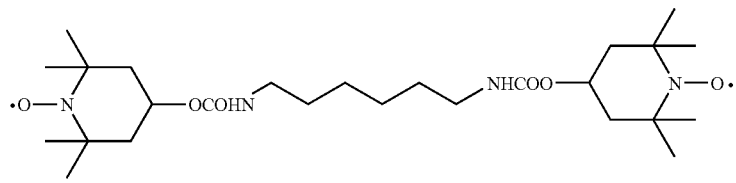
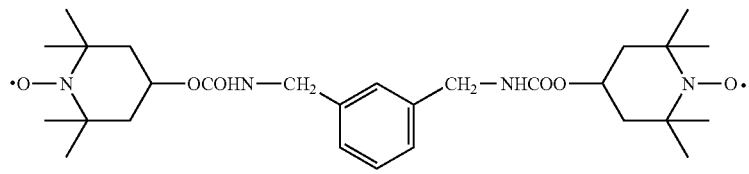
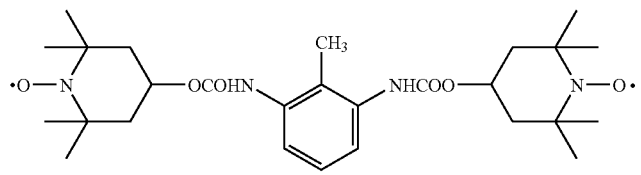
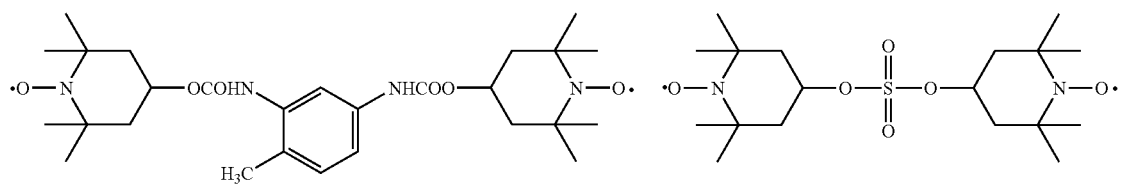
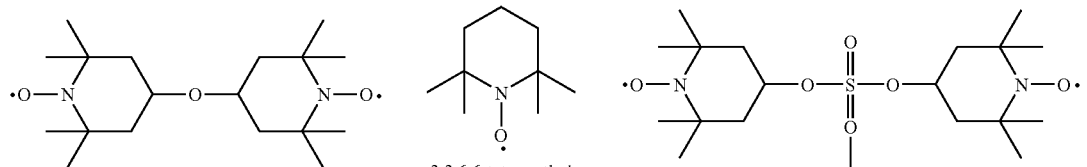
2,2,6,6-tetramethyl piperdin-1-yloxy
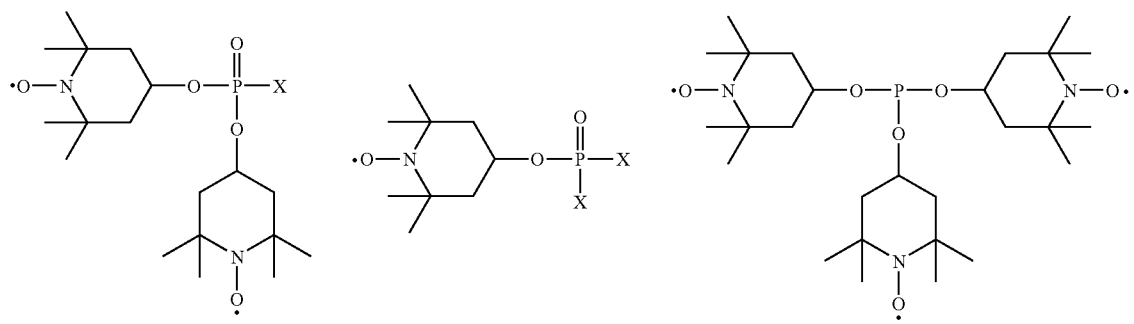
X; Br or Cl

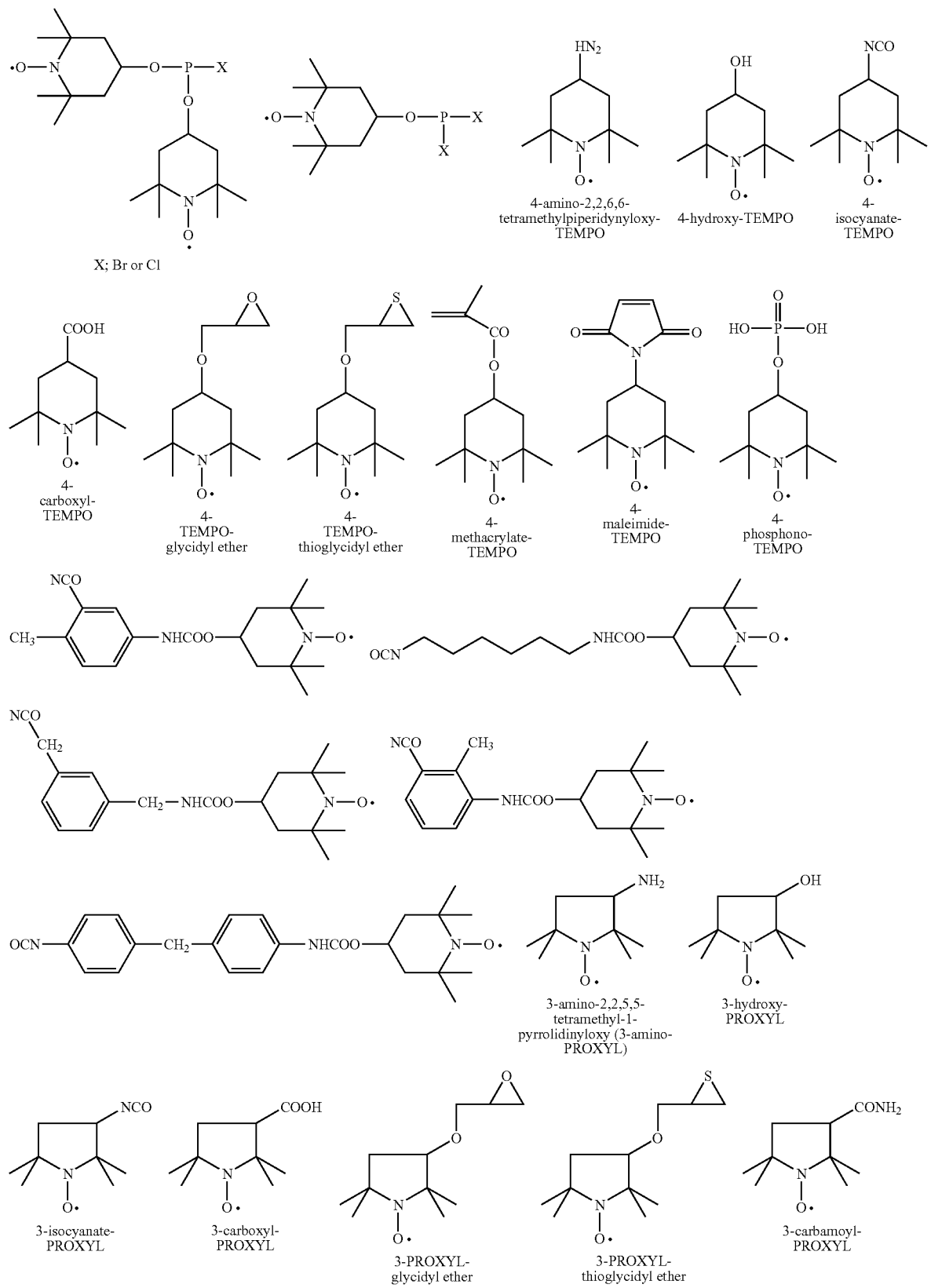

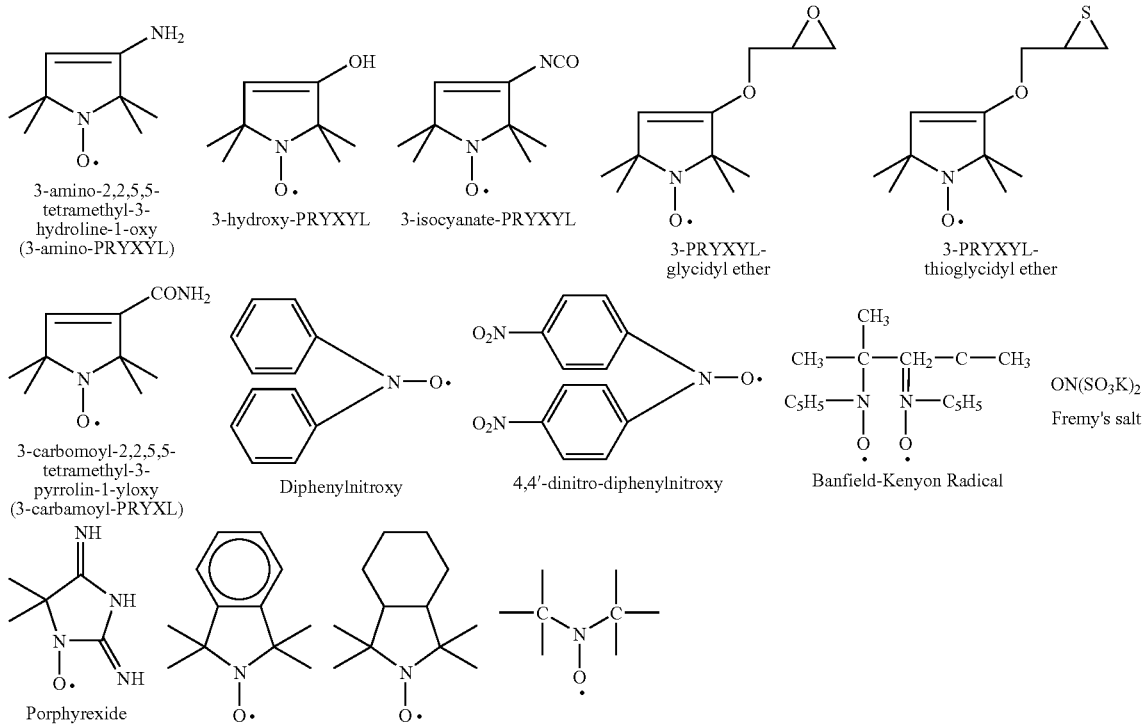

The amount of use of the compound (a) in the present invention is not particularly limited, but is preferably 0.001 to 0.5 mole, more preferably 0.005 to 0.1 mole, based upon 100 g of the butyl rubber to be modified. If the amount used is small, the amount of modification of the butyl rubber is liable to be decreased, while conversely if large, the subsequent cross-linking is liable not to proceed.

As the radical initiator (b) usable in the present invention, it is possible to use any radical initiator capable of introducing the compound (a) into the molecular chain of the butyl rubber, specifically, benzoyl peroxide, t-butyl peroxybenzoate, dicumyl peroxide, t-butylcumyl peroxide, di-t-butyl peroxide, 2,5-dimethyl-2,5-di-t-butyl peroxyhexane, 2,5-dimethyl-2,5-di-t-butyl peroxy-3-hexine, 2,4-dichlorobenzoyl peroxide, di-t-butylperoxy-diisopropylbenzene, 1,1-bis(t-butylperoxy)-3,3,5-trimethyl cyclohexane, n-butyl-4,4-bis(t-butylperoxy)valerate, 2,2-bis(t-butylperoxy)butane, diisobutyl peroxide, cuznylperoxy neodecanate, di-n-propylperoxy dicarbonate, diisopropylperoxy dicarbonate, di-sec-butylperoxy dicarbonate, 1,1,3,3-tetramethylbutylperoxy neodecanate, di(4-t-butylcyclohexyl)peroxy dicarbonate, 1-cyclohexyl-1-methylethylperoxy neodecanate, di(2-ethoxyethyl) peroxy dicarbonate, di(2-ethoxyhexyl)peroxy dicarbonate, t-hexylperoxy neodecanate, dimethoxybutylperoxy dicarbonate, t-butylperoxy neodecanate, t-hexylperoxy pivalate, t-butylperoxy pivalate, di(3,5,5-trimethylhexanoyl)peroxide, di-n-octanoyl peroxide, dilauroyl peroxide, distearoyl peroxide, 1,1,3,3-tetramethylbutylperoxy-2-ethylhexanoate, disuccinate peroxide, 2,5-dimethyl-2,5-di(2-ethylhexanoylperoxy)hexane, t-hexylperoxy-2-ethyl hexanoate, di(4-methylbenzoyl) peroxide, t-butylperoxy-2-ethyl hexanoate, di(3-methylbenzoyl) peroxide, mixtures of benzoyl (3-methylbenzoyl) peroxide and dibenzoyl peroxide, dibenzoyl peroxide, t-butylperoxy isobutylate, etc. may be mentioned. Further, as typical initiators among initiators able to break down at a low temperature by a redox catalyst, dibenzoyl peroxide, paramethane hydroperoxide, diisopropylbenzene hydroperoxide, 1,1,3,3-tetramethylbutyl hydroperoxide, cumen hydroperoxide, t-butyl hydroperoxide, etc. may be mentioned.

According to the present invention, by adding the above radical initiators (b) into the reaction system (i.e., mixing system, catalytic system), it is possible to generate carbon radicals in the butyl rubber. By reacting a compound (a) having stable free radicals with the carbon radicals, a modified butyl rubber can be obtained.

The addition amount of the radical initiator (b) used in the present invention is not particularly limited, but is preferably 0.001 to 0.5 mole, more preferably 0.005 to 0.2 mole based upon 100 g of the butyl rubber to be modified. If the amount is too small, the amount of hydrogen atoms taken from the butyl rubber chain is liable to become lower, while conversely if too large, the main chain of the butyl rubber is liable to break down and the molecular weight is liable to be greatly decreased.

The bifunctional or higher functional radical polymerizable monomer (c) usable in the present invention is not particularly limited, but, can be for example, ethylene di(meth) acrylate (here, the expression "ethylene di(meth)acrylate" includes both ethylene dimethacrylate and ethylene diacrylate. Same below even for different compounds), trimethylolpropane tri(meth)acrylate, ethyleneglycol di(meth)acrylate, polyethyleneglycol di(meth)acrylate, 1,6-hexanediol di(meth)acrylate, tetramethylolmethane tri(meth)acrylate, tetramethylolmethane tetra(meth)acrylate, polypropyleneglycol di(meth)acrylate, N,N'-phenylene dimaleimide, bismaleimide diphenylmethane, N,N'-phenylenediacrylamide, divinylbenzene, triallyl isocyanulate, etc. may be mentioned. Among these, a monomer including an electron-attractive group in the molecule (e.g., a carbonyl group (ketone, aldehyde, ester, carboxylic acid, carboxylates, amide), nitro group, cyano group, etc.) is preferable from the viewpoint of increasing the monomer modification rate.

The amount of use of said bifunctional or higher functional polymerizable monomer (c) is not particularly limited, but preferably is 0.001 to 0.5 mole, more preferably 0.005 to 0.2 mole, based upon 100 g of the butyl rubber to be modified. If the amount is too small, the subsequent cross-linking is liable not to proceed, while if too large, the cross-linked product is liable to be decreased in the physical properties, thereof.

In the present invention, the method of modifying butyl rubber with the compound (a), the initiator (b) and the monomer (c) is not particularly limited. For example, it can be modified as follows. A premixed mixture of butyl rubber, the compound (a) and the initiator (b) can be reacted in an internal mixer, in which the air is substituted with nitrogen, at a temperature of, for example, 150 to 220° C., then, once decreased in temperature, charged with the monomer (c), the air again substituted with nitrogen, and mixed and reacted at a temperature of, for example, 150 to 220° C. to obtain the desired modified butyl rubber composition. Further, the butyl rubber, the compound (a), the initiator (b) and the monomer (c) can be simultaneously mixed and reacted. Additionally, said modification can be carried out using a twin-screw extruder, single-screw extruder, rolls, etc.

The modified butyl rubber composition used in the present invention may be mixed with, for example, preferably 5 to 300 parts by weight, more preferably 30 to 200 parts by weight, of carbon black and/or silica or another reinforcing filler or other general rubber additives, based upon 100 parts by weight of the rubber component including the modified butyl rubber:

The cross-linking agent (C) used in the present invention is not particularly limited. For example, benzoyl peroxide, t-butylperoxy benzoate, dicumyl peroxide, t-butylcumyl peroxide, di-t-butyl peroxide, 2,5-dimethyl-2,5-di-t-butyl peroxyhexane, 2,5-dimethyl-2,5-di-t-butyl peroxy-3-hexine, 2,4-dichlorobenzoyl peroxide, di-t-butylperoxy-diisopropyl benzene, 1,1-bis(t-butylperoxy)-3,3,5-trimethylcyclohexane, n-butyl-4,4-bis(t-butylperoxy)valerate, 2,2-bis(t-butylperoxy)butane), or another organic peroxide and azodicarbonamide, azobisisobutylonitrile, 2,2'-azobis-(2-amidinopropane)dehydrochloride, dimethyl-2,2'-azobis (isobutylate), azobis-cyanovalerate, 1,1'-azobis-(2,4-dimethylvaleronitrile), azobismethylbutyronitrile, 2,2'-azobis-(4-methoxy-2,4-dimethylvaleronitrile), or an other azo-based radical initiator etc. can be mixed in an amount of, preferably 0.05 to 15 parts by weight, more preferably 0.1 to 10 parts by weight.

It is possible to obtain the thermoplastic elastomer composition according to the present invention by dynamically cross-linking the thermoplastic resin (A), the modified butyl rubber (B) and the cross-linking agent (C). Here, "dynamically cross-linking" means a cross-linking or curing process of the rubber (i.e., the cross-linkable elastomer) which is included in the thermoplastic elastomer composition, where the rubber is cross-linked under the conditions of a temperature higher than the melting point of the thermoplastic component and a shear. Specifically, dynamically cross-linking can be carried out in a conventional mixer such as a mixing mill, a Banbury mixer, Brabender mixer, continuous mixer, mixing extruder and the like, by mixing the thermoplastic elastomer component at a high temperature.

The thermoplastic elastomer composition according to the present invention may contain therein, in addition to the above-mentioned components, other reinforcing agents (e.g., fillers), vulcanizing or cross-linking agents, vulcanizing or cross-link accelerators, various types of oil, antioxidants, plasticizers and other various types of additives generally compounded into tire use and other rubber compositions. The additives may be mixed by a general method to form a composition for vulcanization or cross-linking. The amounts of these additives added may be made the conventional general amounts added so long as the object of the present invention is not adversely affected.

EXAMPLES

Examples will now be used to further explain the present invention, but the scope of the present invention is not limited to these Examples.

Synthesis Example of Modified Butyl Rubber Composition 100 parts by weight of regular butyl rubber (made by Bayer, Butyl 301), 7.4 parts by weight of OH-TEMPO (made by Asahi Denka, LA7RD (i.e., 4-hydroxy-2,2,6,6-tetramethylpiperidinyl-1-oxyl)) and 5.5 parts by weight of Parkadox 14R-P (manufactured by Kayaku Akzo Co., Ltd., 1,3-bis-(t-butyl peroxyisopropyl)benzene) were mixed by a kneader. The master batch obtained was pelletized using a pelletizer and supplied to a co-rotating twin screw extruder (L/D 49, screw diameter 30 mm) at a rate of 4.0 kg/h set to a temperature of 185° C. and a 100 rpm screw rotational speed. Ditrimethylolpropane tetraacrylate was added by an intermediate vent and reacted at a rate of 0.44 kg/h.

Preparation of Rubber Compositions 1 to 3

Each component of the mixture (parts by weight) shown in Table 1 was mixed in a 600 cc internal mixer for 6 minutes.

TABLE I

| Formulation (parts by weight) | Rubber composition 1 | Rubber composition 2 | Rubber composition 3 |
|---|---|---|---|
| reg-IIR*[1] | 100 | 100 | — |
| IIR-GTe*[2] | — | — | 121.1*[7] |
| Carbon black*[3] | 10 | 10 | 10 |
| Stearic acid*[4] | 1 | 1 | 1 |
| DCP*[5] | — | — | 0.9 |
| Brominated alkylphenol formaldehyde resin*[6] | — | 10 | — |

Footnotes of TABLE I
*[1]Butyl rubber (manufactured by Bayer, BUTYL 301).
*[2]See the synthesis example of the modified butyl rubber.
*[3]Asahi#50 manufactured by Asahi Carbon.
*[4]Beads Stearic Acid YR manufactured by NOF Corporation.
*[5]Dicumyl peroxide manufactured by NOF Corporation, Percumyl D.
*[6]Tackrol 250-1 (manufactured by Taoka Chemical Co., Ltd.).
*[7]Prepared so that rubber ingredient becomes 100 parts by weight.

Examples 1 to 2 and Comparative Examples 1 to 2

The polypropylene and rubber compositions 1, 2 or 3 (see Table I) were the predetermined amounts shown in Table II, injected into an internal mixer set to a temperature 180° C. and a revolution speed of 100 rpm, and mixed for 8 minutes. Note that the 100% modulus of the composition obtained, the breaking strength and the elongation at break were determined, according to JIS K6251, and further the compression set were determined by the above method. The results are shown in Table II.

Compression set (%): A sample of a predetermined shape was fabricated by shaping conditions similar to a D hardness measurement sample according to JIS K6251. The compression set (%) after 25% compression at 100° C. for 22 hours was determined.

TABLE II

|  | Comp. Ex 1 | Comp. Ex 2 | Ex. 1 | Ex. 2 |
| --- | --- | --- | --- | --- |
| Formulation (parts by weight) |  |  |  |  |
| PP*[1] | 30 | 30 | 30 | 20 |
| Rubber composition 1*[2] | 70 | — | — | — |
| Rubber composition 2*[2] | — | 70 | — | — |
| Rubber composition 3*[2] | — | — | 70 | 80 |
| Evaluation |  |  |  |  |
| Condition of sheet | Poor | Good | Good | Good |
| 100% modulus (MPa) | — | 1.16 | 2.12 | 2.55 |
| Breaking strength (MPa) | — | No breaks | 3.70 | 3.16 |
| Elongation at break (%) | — | No breaks | 341 | 188 |
| Compression set (%) | — | 98 | 22 | 32 |

*[1]C200F(MFR6) polypropylene manufactured by SunAllomer Ltd.
*[2]see Table I

INDUSTRIAL APPLICABILITY

As explained above, according to the present invention, by blending a modified butyl rubber composition obtained by reacting, to an ordinary butyl rubber, (a) a TEMPO derivative or other compound having, in the molecule thereof, a nitroxide-free radical stable at an ordinary temperature in the presence of oxygen, (b) a radical initiator and (c) a bifunctional or higher functional radical polymerizable monomer with a thermoplastic resin and cross-linking agent, it is possible to obtain a modified butyl rubber composition capable of being dynamically cross-linked by peroxide cross-linking. This can be used, as parts etc. which require vibration dampening, heat resistance, gas (solvent) permeation resistance, weatherability, ozone resistance, impact resistance, low compressive set, and other characteristics in belts, hoses, vibration proofing rubber, rollers, sheets, linings, rubber coated fabrics, sealing materials, gloves, fenders, various medical and physico-chemical supplies, engineering supplies, marine, automobile, tire, railroad, OA, aircraft, and packaging rubber products and the like.

The invention claimed is:

1. A dynamically cross-linked thermoplastic elastomer composition obtained from dynamic cross-linking of a composition comprising:
   (A) 10 to 50 parts by weight of a crystalline polyolefin,
   (B) 50 to 90 parts by weight of a modified butyl rubber composition containing a modified butyl rubber modified by reacting, to butyl rubber, (a) a compound containing, in the molecule thereof, a nitroxide free radical stable at an ordinary temperature in the presence of oxygen, (b) a radical initiator and (c) a bifunctional or higher functional radical polymerizable monomer, and
   (C) 0.01 to 15 parts by weight of a cross-linking agent,
   wherein said dynamic cross-linking is carried out at a temperature higher than the melting point of the polyolefin (A) and under a condition of shear.

2. A dynamically cross-linked thermoplastic elastomer composition as claimed in claim 1, wherein the crystalline polyolefin of component (A) is at least one member selected from the group consisting of polyethylene, polypropylene, ethylene-propylene copolymer, copolymer of ethylene and/or propylene and α-olefin and copolymer of ethylene and/or propylene and butene.

3. A dynamically cross-linked thermoplastic elastomer composition as claimed in claim 1, wherein the component (C) is an organic peroxide or an organic azo compound.

4. A dynamically cross-linked thermoplastic elastomer composition as claimed in claim 1 wherein said compound (a) is 0.001-0.5 mole, based upon 100 g of the butyl rubber, of 2,2,6,6-tetramethyl-1-piperidinyloxy and the deriviatives thereof, said radical initiator is 0.001-0.5 mole, based upon 100 g of the butyl rubber, of a radical initiator selected from benzoyl peroxide (BPO), t-butyl peroxybenzoate (Z), dicumyl peroxide (DCP), t-butylcumyl peroxide (C), di-t-butyl peroxide (D), 2,5-dimethyl-2,5-di-t-butyl peroxyhexane (2.5B), 2,5-dimethyl-2,5-di-t-butyl peroxy-3-hexine (Hexyne-3), 2,4-dichlorobenzoyl peroxide (DC-BPO), di-t-butylperoxy-diisopropylbenzene (P), 1,3-bis(t-butylperoxy-isopropyl)benzene, 1,1-bis(t-butylperoxy)-3,3,5-trimethyl cyclohexane (3M), n-butyl-4,4-bis(t-butylperoxy)valerate, 2,2-bis(t-butylperoxy)butane, diisobutyl peroxide, said compound (C) is 0.001-0.5 mole, based upon 100 g of the butyl rubber, of a compound selected from ethylene di(meth)acrylate, trimethylolpropane tri(meth)acrylate, ethyleneglycol di(meth)acrylate, polyethyleneglycol di(meth)acrylate, 1,6-hexanediol di(meth)acrylate, tetramethylolmethane tri(meth)acrylate, tetramethylolmethane tetra(meth)acrylate, polypropyleneglycol di(meth)acrylate, N,N'-phenylene dimaleimide, bismaleimide diphenylmethane, N,N'-phenylenediacrylamide, divinylbenzene, divinylbenzene, isocyanurate.

5. A dynamically cross-linked thermoplastic elastomer composition as claimed in claim 2, wherein the component (C) is an organic peroxide or an organic azo compound.

6. A dynamically cross-linked thermoplastic elastomer composition as claimed in claim 5 wherein said compound (a) is 0.001-0.5 mole, based upon 100 g of the butyl rubber, of 2,2,6,6-tetramethyl-1-piperidinyloxy and the deriviatives thereof, said radical initiator is 0.001-0.5 mole, based upon 100 g of the butyl rubber, of a radical initiator selected from benzoyl peroxide (BPO), t-butyl peroxybenzoate (Z), dicumyl peroxide (DCP), t-butylcumyl peroxide (C), di-t-butyl peroxide (D), 2,5-dimethyl-2,5-di-t-butyl peroxyhexane (2.5B), 2,5-dimethyl-2,5-di-t-butyl peroxy-3-hexine (Hexyne-3), 2,4-dichlorobenzoyl peroxide (DC-BPO), di-t-butylperoxy-diisopropylbenzene (P), 1,3-bis(t-butylperoxy-isopropyl)benzene, 1,1-bis(t-butylperoxy)-3,3,5-trimethyl cyclohexane (3M), n-butyl-4,4-bis(t-butylperoxy)valerate, 2,2-bis(t-butylperoxy)butane, diisobutyl peroxide, said compound (C) is 0.001-0.5 mole, based upon 100 g of the butyl rubber, of a compound selected from ethylene di(meth)acrylate, trimethylolpropane tri(meth)acrylate, ethyleneglycol di(meth)acrylate, polyethyleneglycol di(meth)acrylate, 1,6-hexanediol di(meth)acrylate, tetramethylolmethane tri(meth)acrylate, tetramethylolmethane tetra(meth)acrylate, polypropyleneglycol di(meth)acrylate, N,N'-phenylene dimaleimide, bismaleimide diphenylmethane, N,N'-phenylenediacrylamide, divinylbenzene, divinylbenzene, isocyanurate.

7. A dynamically cross-linked thermoplastic elastomer composition as claimed in claim 2 wherein said compound (a) is 0.001-0.5 mole, based upon 100 g of the butyl rubber, of 2,2,6,6-tetramethyl-1-piperidinyloxy and the deriviatives thereof, said radical initiator is 0.001-0.5 mole, based upon 100 g of the butyl rubber, of a radical initiator selected from benzoyl peroxide (BPO), t-butyl peroxybenzoate (Z), dicumyl peroxide (DCP), t-butylcumyl peroxide (C), di-t-butyl peroxide (D), 2,5-dimethyl-2,5-di-t-butyl peroxyhexane (2.5B), 2,5-dimethyl-2,5-di-t-butyl peroxy-3-hexine (Hexyne-3), 2,4-dichlorobenzoyl peroxide (DC-BPO), di-t-butylperoxy-diisopropylbenzene (P), 1,3-bis(t-butylperoxy-isopropyl)benzene, 1,1-bis(t-butylperoxy)-3,3,5-trimethyl cyclohexane (3M), n-butyl-4,4-bis(t-butylperoxy)valerate, 2,2-bis(t-butylperoxy)butane, diisobutyl peroxide, said compound (C) is 0.001-0.5 mole, based upon 100 g of the butyl rubber, of a compound selected from ethylene di(meth)acrylate, trimethylolpropane tri(meth)acrylate, ethyleneglycol di(meth)acrylate, polyethyleneglycol di(meth)acrylate, 1,6-hexanediol di(meth)acrylate, tetramethylolmethane tri(meth)acrylate, tetramethylolmethane tetra(meth)acrylate, polypropyleneglycol di(meth)acrylate, N,N'-phenylene dimaleimide, bismaleimide diphenylmethane, N,N'-phenylenediacrylamide, divinylbenzene, divinylbenzene, isocyanurate.

8. A dynamically cross-linked thermoplastic elastomer composition as claimed in claim 3 wherein said compound (a) is 0.001-0.5 mole, based upon 100 g of the butyl rubber, of 2,2,6,6-tetramethyl-1-piperidinyloxy and the deriviatives thereof, said radical initiator is 0.001-0.5 mole, based upon 100 g of the butyl rubber, of a radical initiator selected from benzoyl peroxide (BPO), t-butyl peroxybenzoate (Z), dicumyl peroxide (DCP), t-butylcumyl peroxide (C), di-t-butyl peroxide (D), 2,5-dimethyl-2,5-di-t-butyl peroxyhexane (2.5B), 2,5-dimethyl-2,5-di-t-butyl peroxy-3-hexine (Hexyne-3), 2,4-dichlorobenzoyl peroxide (DC-BPO), di-t-butylperoxy-diisopropylbenzene (P), 1,3-bis(t-butylperoxy-isopropyl)benzene, 1,1-bis(t-butylperoxy)-3,3,5-trimethyl cyclohexane (3M), n-butyl-4,4-bis(t-butylperoxy)valerate, 2,2-bis(t-butylperoxy)butane, diisobutyl peroxide, said compound (C) is 0.001-0.5 mole, based upon 100 g of the butyl rubber, of a compound selected from ethylene di(meth)acrylate, trimethylolpropane tri(meth)acrylate, ethyleneglycol di(meth)acrylate, polyethyleneglycol di(meth)acrylate, 1,6-hexanediol di(meth)acrylate, tetramethylolmethane tri(meth)acrylate, tetramethylolmethane tetra(meth)acrylate, polypropyleneglycol di(meth)acrylate, N,N'-phenylene dimaleimide, bismaleimide diphenylmethane, N,N'-phenylenediacrylamide, divinylbenzene, divinylbenzene, triallyl isocyanurate.

\* \* \* \* \*